(No Model.)

M. E. SPRAGUE.
AUTOMATIC DISCHARGER FOR EVAPORATING PANS.

No. 332,019. Patented Dec. 8, 1885.

WITNESSES:
Theo. G. Hoster
C. Sedgwick

INVENTOR:
M. E. Sprague
BY Munn & Co
ATTORNEYS.

UNITED STATES PATENT OFFICE.

MYRON EDSON SPRAGUE, OF PLYMOUTH, VERMONT.

AUTOMATIC DISCHARGER FOR EVAPORATING-PANS.

SPECIFICATION forming part of Letters Patent No. 332,019, dated December 8, 1885.

Application filed June 5, 1885. Serial No. 167,802. (No model.)

*To all whom it may concern:*

Be it known that I, MYRON EDSON SPRAGUE, of Plymouth, Windsor county, Vermont, have invented a new and Improved Automatic Discharger, of which the following is a full, clear, and exact description.

The object of my invention is to provide a new and improved discharger for evaporating-pans, which discharger is so constructed as to automatically open a valve, through which the evaporated liquid can be drawn from the pan when it has the desired density.

The invention consists in the combination, with a pan having an outlet-opening, of a pivoted lever having a valve for closing said opening, a float with which the lever is connected, and weights for weighting the float.

Reference is to be had to the accompanying drawings, forming a part of this specification, in which similar letters of reference indicate corresponding parts in all the figures.

Figure 1:
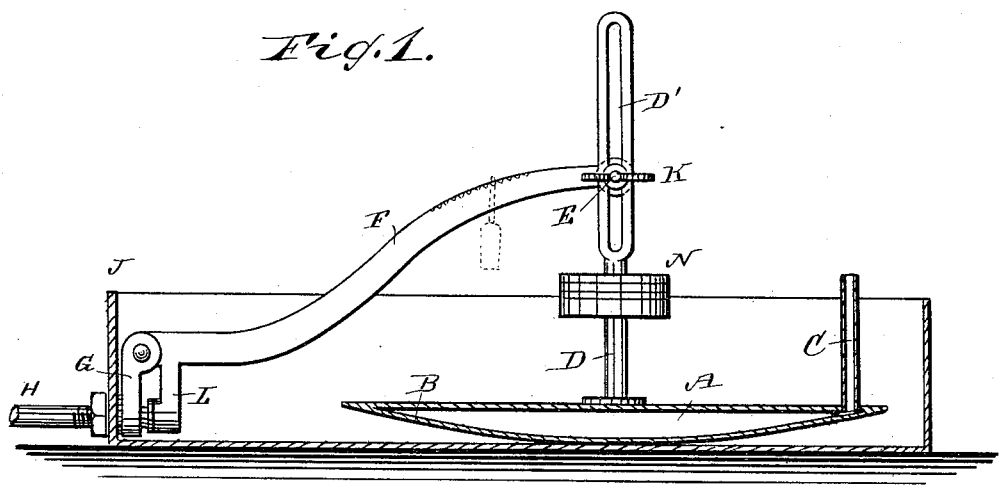
Figure 2:
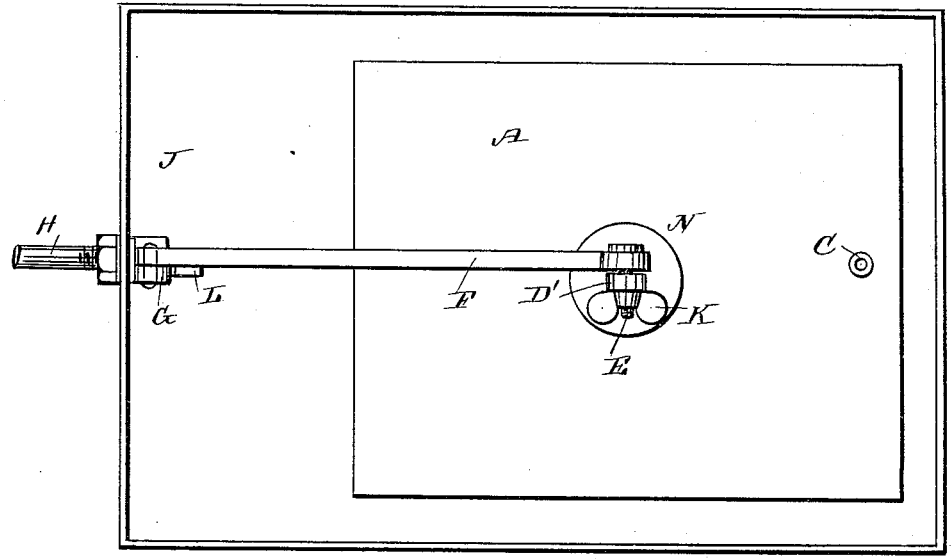
Figure 3:
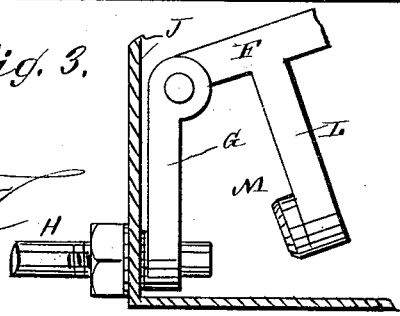

Figure 1 is a longitudinal sectional elevation of a pan and my improved discharger in the same. Fig. 2 is a plan view of the pan and discharger. Fig. 3 is a detail view of the valve.

The hollow float A is provided with a convex bottom, B, and a vent-tube, C, through which the air in the float can escape when it is heated, thus preventing the heated air from expanding and rupturing the float. From the float A a stem, D, projects upward, which has a longitudinally-slotted upper part, D', through which a screw, E, passes, which also passes through one end of a lever, F, having its other end pivoted in a short standard, G, on the end of the outlet-pipe H, which is passed through the end of the pan J near the bottom. A winged nut, K, is screwed on the screw E. An arm, L, projects downward from the lever F, and on the said arm a valve, M, is secured, which serves to close the pipe H. Weights N are held on the stem D.

The operation is as follows: The stem D is weighted more or less, according to the desired density of the liquid—that is, if the liquid is not to be discharged until it has a certain density, the float is so weighted that the liquid cannot float it until the said density is obtained. When this is reached, the float rises to the surface of the liquid, moves up the lever F, and swings the valve M from the end of the pipe H, thus permitting the liquid to flow out of the pan.

The above-described discharger can be used on pans for concentrating sirup, brine, and other liquids, and can be adjusted on pans of different sizes, the slotted part D' permitting of adjusting the lever F higher or lower, according to the height of the pan.

If desired, a weight can be placed on the lever F in the same manner as the poise of a steelyard is placed on its lever, and the said lever may have notches for adjusting the weight in different positions.

If desired, the weights can be put on both the lever and the standard D.

Having thus described my invention, I claim as new and desire to secure by Letters Patent—

1. The combination, with a pan having a discharge-aperture, of a pivoted lever carrying a valve for closing said aperture, a float connected to said lever, and weights for holding the float submerged in the liquid, substantially as and for the purpose set forth.

2. The combination, with a pan having a discharge-aperture, of a pivoted lever carrying a valve for closing said aperture, a hollow float connected with the lever, which float has a convex bottom and an air-outlet tube, and weights for holding the float submerged in the liquid, substantially as herein shown and described.

3. The combination, with a pan having a discharge-aperture, of a pivoted lever carrying a valve for closing said aperture, a float, a standard in the pan pivotally connected with the above valve-lever, and of weights on a stem projecting upward from the float, substantially as herein shown and described.

4. The combination, with a pan having an outlet-pipe, of a pivoted lever having a valve for closing the pipe, the float A, the stem D, having the slotted part D', and of a screw and nut for holding the valve-lever on the slotted part D', substantially as herein shown and described.

MYRON EDSON SPRAGUE.

Witnesses:
REUBEN TAYLOR,
HARRIET N. TAYLOR.